(12) United States Patent
Kumar et al.

(10) Patent No.: US 8,664,458 B2
(45) Date of Patent: Mar. 4, 2014

(54) METHOD FOR PRODUCING WAXES AND GREASE BASE STOCKS THROUGH CATALYTIC DEPOLYMERISATION OF WASTE PLASTICS

(75) Inventors: Anil Kumar, Kanpur (IN); Pushkar Kumar, Toronto (CA)

(73) Assignee: Greenmantra Recycling Technologies Ltd., Toronto (CA)

( * ) Notice: Subject to any disclaimer, the term of this patent is extended or adjusted under 35 U.S.C. 154(b) by 837 days.

(21) Appl. No.: 12/836,594

(22) Filed: Jul. 15, 2010

(65) Prior Publication Data

US 2012/0016169 A1    Jan. 19, 2012

(51) Int. Cl.
 *C07C 1/00* (2006.01)
(52) U.S. Cl.
 USPC .............................. 585/241; 201/21
(58) Field of Classification Search
 USPC ........................... 585/241; 201/21
 See application file for complete search history.

(56) References Cited

U.S. PATENT DOCUMENTS

| | | | |
|---|---|---|---|
| 3,332,926 A | | 7/1967 | Baron, Jr. et al. |
| 3,441,628 A | | 4/1969 | Rätzsch et al. |
| 4,642,401 A | * | 2/1987 | Coenen et al. ................ 585/241 |
| 5,158,982 A | | 10/1992 | Stapp |
| 5,369,215 A | * | 11/1994 | Platz ............................ 585/241 |
| 5,728,909 A | | 3/1998 | Butcher, Jr. |
| 5,731,483 A | | 3/1998 | Stabel et al. |
| 5,821,395 A | | 10/1998 | Price et al. |
| 5,849,964 A | * | 12/1998 | Holighaus et al. ............ 585/241 |
| 6,143,940 A | * | 11/2000 | Miller et al. .................. 585/240 |
| 6,150,577 A | | 11/2000 | Miller et al. |
| 6,172,271 B1 | | 1/2001 | Horizoe et al. |
| 6,184,427 B1 | | 2/2001 | Klepfer et al. |
| 6,288,296 B1 | | 9/2001 | Miller et al. |
| 6,822,126 B2 | * | 11/2004 | Miller ........................... 585/241 |

(Continued)

FOREIGN PATENT DOCUMENTS

| | | |
|---|---|---|
| CA | 2202941 A1 | 10/1998 |
| CH | 646717 A5 | 12/1984 |

(Continued)

OTHER PUBLICATIONS

Sunder Lal, K.S. Anisia and A. Kumar, Development of heterogeneous catalyst by ionically bonding macrocyclic Zr—Zr complex to montmorillonite clay for depolymerization of polypropylene, Journal of Molecular Catalysis A: Chemical, Mar. 16, 2007, pp. 15-24, vol. 265, Issues 1-2.

(Continued)

*Primary Examiner* — Nina Bhat
(74) *Attorney, Agent, or Firm* — Osha Liang LLP (57) ABSTRACT

In a process for converting mixed polyethylene waste to make waxes and grease base stocks through catalytic depolymerization, the mixed polyethylene waste is preheated to form a molten mixed polyethylene waste. Then, depolymerization reaction of the molten mixed polyethylene waste is started. The depolymerization reaction uses a catalyst in a high pressure reactor at a desired temperature using heaters in the high pressure reactor. The catalyst is disposed on a stirring blade. Progression of depolymerization reaction of the molten mixed polyethylene waste is allowed to continue until a pressure in the high pressure reactor reaches a desired value. The heaters are turned off and depolymerization reaction of the molten mixed polyethylene waste is stopped upon the pressure in the reactor reaching desired value. The mixed polyethylene waste is converted to wax or grease base stock.

23 Claims, 8 Drawing Sheets

(56) References Cited

U.S. PATENT DOCUMENTS

| | | | | |
|---|---|---|---|---|
| 7,834,226 B2 * | 11/2010 | Miller | | 585/240 |
| 7,893,307 B2 * | 2/2011 | Smith | | 585/241 |
| 8,168,839 B2 * | 5/2012 | Niu | | 585/241 |
| 2005/0148487 A1 | 7/2005 | Brownscombe et al. | | |

FOREIGN PATENT DOCUMENTS

| | | | |
|---|---|---|---|
| DE | 3642273 A1 | 4/1987 | |
| EP | 0577279 A1 | 1/1994 | |
| EP | 0717094 A1 | 6/1996 | |
| EP | 1707614 A1 | 10/2006 | |
| GB | 1310260 A | 3/1973 | |

OTHER PUBLICATIONS

Sunder Lal, K.S. Anisia and A. Kumar, Depolymerization of Hdpe to wax in the presence of a catalyst formed by homonuclear macrocyclic zirconium complex chemically bonded to alumina support, Journal of Molecular Applied Catalysis A: General, Apr. 18, 2006, pp. 9-17, vol. 303, Issues 1.

Young San You, Jong-Ho Kim and Gon Seo, Liquid-phase catalytic degradation of polyethylene wax over silica-modified zeolite catalysts, Polymer Degradation and Stability, May 2001, pp. 329-336, vol. 265, Issue 2.

Weibing Ding, Jing Liang and Larry L. Anderson, Thermal and catalytic degradation of high density polyethylene and commingled post-consumer plastic waste, Fuel Processing Technology, Mar. 1997, pp. 47-62, vol. 51, Issues 1-2.

G. Luo, T. Suto, S. Yasu and K. Kato, Catalytic degradation of high density polyethylene and polypropylene into liquid fuel in a powder-particle fluidized bed, Polymer Degradation and Stability, 2000, pp. 97-102, vol. 70, Issue 1.

Y.H. Seo, K.H. Lee and D.H. Shin, Investigation of Catalytic degradation of HDPE by hydrocarbon group type analysis, Journal of Analytical and Applied Pyrolysis, Dec. 2003, pp. 97-102, vol. 70, Issue 2.

A. G. Buekens and H. Huang, Catalytic plastics cracking for recovery of gasoline-range hydrocarbons from municipal plastic wastes, Resources, Conservation and Recycling, Aug. 1998, pp. 163-181, vol. 23, Issue 3.

M. V. S. Murty, P. Rangarajan, E. A. Grulke, and D. Bhattacharya, Thermal degradation /Hydrogenation of Commodity plastics and characterization of their liquefaction products, Fuel Processing Technology, Oct.-Dec. 1996, pp. 75-90, vol. 49, Issues 1-3.

M. Azhar Uddin, Yusaku Sakata, Akinori Muto, Yoshitaka Shiraga, Kazuo Koizumi, Yasufumi Kanada, Katsuhide Murata, Catalytic degradation of polyethylene and polypropylene into liquid hydrocarbons with mesoporous silica, Microporous and Mesoporous Materials, May 1998, pp. 557-564, vol. 21, Issues 4-6.

Espacenet English Abstract for Canadian Patent Application No. CA-2,202,941 (1 page).

Espacenet English Abstract for German Patent Application No. DE-3642273 (1 page).

Espacenet English Abstract for Swiss Patent Application No. CH-646717 (2 pages).

PCT International Search Report and Written Opinion dated Jan. 5, 2012, in related International Patent Application No. PCT/IB2011/001642 (13 pages).

PCT International Preliminary Report on Patentability dated Sep. 27, 2012, in related International Application No. PCT/IB2011/001642 (11 pages).

EPO Communication pursuant to Article 94(3) EPC (Office Action) dated Oct. 16, 2012, in related European Patent Application No. EP-10172039.9-104 (3 pages).

European Search Report dated Apr. 4, 2011, in related European Patent Application No. EP-10172039 (2 pages).

Extended European Search Report dated Apr. 15, 2011, in related European Patent Application No. Ep-10172039.9-2104 (5 pages).

Lal, Sunder, et al., "Depolymerization of HDPE to wax in the presence of a catalyst formed by homonuclear macrocyclic zirconium complex chemically bonded to alumina support"; Applied Catalysis A: General 303 (2006); doi: 10.1016/j.apcata.2006.01.016; pp. 9-17.

* cited by examiner

METHOD FOR PRODUCING WAXES AND GREASE BASE STOCKS THROUGH CATALYTIC DEPOLYMERISATION OF WASTE PLASTICS

BACKGROUND

Manufacturers of mechanical equipment, food packagers, and other users of wax and grease for lubricating, sealing, and other uses have a continuing need for wax and grease compositions. Manufacturing of these waxes and greases are usually expensive. This may be typically due to requirement of pricey petroleum feed in such manufacturing process.

Waxes and grease (or grease base-stocks), in general, are made from petroleum feed or gas-to-liquid processes. The price of petroleum feed stocks are increasing with time and thus there is a steady increase in prices of waxes- and greases. Recently, there have been several discoveries of gas (mostly methane) reservoirs and using Fischer-Tropsch process; these can be converted into higher chain length hydrocarbons to give gasoline, lubricating oils, grease base stocks, and waxes. The products produced this way are relatively more expensive and thus there is a need to utilize readily available polyethylene waste and recycle them to produce the same materials at considerably lower cost.

It would be advantageous to have a relatively inexpensive process for producing wax and grease base stock. Such a process would ideally utilize a readily available inexpensive feedstock and would use an inexpensive process. Waste plastics/polymers have been used in known processes for the manufacture of such products. Plastic waste is among the fastest growing solid waste and utilizing this solid waste to produce useful wax and grease addresses growing plastic disposal problems.

Further, majority of the polymer/plastics waste may be polyethylene and due to its non-biodegradability, it has been accumulating in nature. Polyethylene waste in general is either land-filled or burnt-former leads to the loss of material and waste of land while the latter results in emission of green-house-gases; only a small proportion of entire plastic waste is currently being recycled as secondary polymers which have poor quality and give low financial returns.

In recent times, there have been considerable efforts to convert these polymeric solid wastes into useful products such as fuels, lubricants, waxes and grease base stocks. Existing conversion processes may not be efficient enough and can release green-house gases into environment. Further, current techniques may be sensitive to quality and quantity of waste plastic feed and they can have an impact to the end product quality. This can be especially important as plastic waste can vary in its consistency due to the varying plastic grades.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A method of producing waxes and grease base stocks through catalytic depolymerization of waste plastics is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
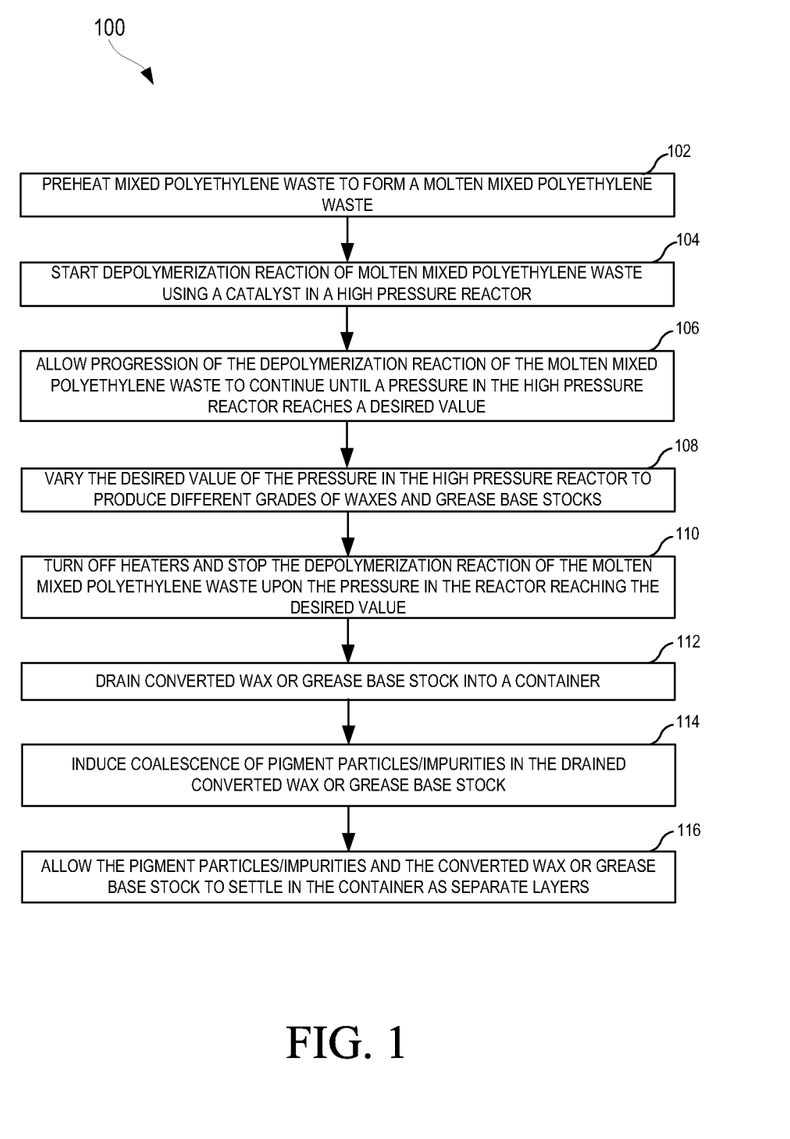
FIG. 1 shows a flow diagram of an exemplary process for converting mixed polyethylene waste to produce waxes and grease base stocks through catalytic depolymerization, according to one embodiment.

FIG. 1 shows a flow diagram 100 of an exemplary process for producing waxes and grease base stocks through catalytic depolymerization of mixed polyethylene waste, according to one embodiment. Waxes are slippery solid materials that are easy to melt. Generally, the melting point of waxes ranges between 45° C. to 130° C. and flash point (i.e. lowest temperature at which the wax can vaporize to form an ignitable mixture in air) ranges between 180° C. to 350° C. The waxes may be mostly derived by refining crude petroleum. The waxes may be also derived from natural secretions of plants and animals. Further, the waxes may be synthetically produced using processes such as Ficher-Tropsch.

The grease or grease base stock is a semi-solid substance introduced between two moving surfaces to reduce the friction between them, improving efficiency and reducing wear. Commercially available greases are generally made by mixing grease base stocks with small amounts of specific additives to give them desired physical properties. Generally, greases are of four types: (a) admixture of mineral oils and solid lubricants (b) blends of residuum, waxes, uncombined fats, rosin oils and pitches, (c) soap thickened mineral oils and (d) synthetic greases like poly-alpha olefins, silicones, etc.

The mixed polyethylene waste may include low density polyethylene (LPDE), linear low density polyethylene (LLPDE) and high density polyethylene (HPDE). For example, the polyethylene waste may be available as shopping bags, grocery bags as sacks of HDPE, milk pouches of LDPE and stationery files of LLDPE. In one embodiment, primary granules of polyethylene may be also used for producing the waxes and grease base stocks. Further, the mixed polyethylene waste may include impurities (e.g., such as polypropylene and polystyrene) up to about 10%.

At step 102, the mixed polyethylene waste is preheated to form a molten mixed polyethylene waste. For example, the mixed polyethylene waste is preheated in an extruder attached to a high pressure reactor (e.g., the reactor 804 of FIG. 8). The molten mixed polyethylene waste formed in the extruder is substantially continuously pushed into the high pressure reactor. At step 104, depolymerization reaction of the molten mixed polyethylene waste is started using a catalyst in the high pressure reactor at a desired temperature using heaters in the high pressure reactor. The catalyst used is [Fe—Cu—Mo—P]/$Al_2O_3$ which is disposed on a stirring blade of the high pressure reactor. The catalyst is prepared by binding a ferrous-copper complex to an alumina support and reacting it with heteropolyacid to obtain the final catalyst. The temperature in the high pressure reactor is in the range of about 300° C. to 600° C.

At step 106, progression of the depolymerization reaction of the molten mixed polyethylene waste is allowed to continue until a pressure in the high pressure reactor reaches a desired value. The pressure in the high pressure reactor is in the range of about 50 psig-350 psig. At step 108, the desired value of the pressure in the high pressure reactor is varied to produce different grades of waxes and grease base stocks. For example, the different grades of waxes include waxes having different melting points ranging from 60° C. to 100° C.

At step 110, the heaters are turned off and the depolymerization reaction of the molten mixed polyethylene waste is stopped upon the pressure in the reactor reaching the desired value. During the depolymerization reaction, the molten mixed polyethylene waste is converted to wax or grease base stock. At step 112, the converted wax or the grease base stock is drained into a container when the converted wax or the grease base stock is liquid and is substantially above flash point.

It can be noted that, during the depolymerization reaction, there is no gas liberated and thus, there is a complete carbon recovery in the form of waxes or grease base stocks. At step 114, coalescence of pigment particles/impurities in the drained converted wax or the grease base stock is started using a high to low pressure cycle. At step 116, the pigment particles/impurities and the converted wax or grease base stock are allowed to settle in the container as separate layers.

Figure 2:
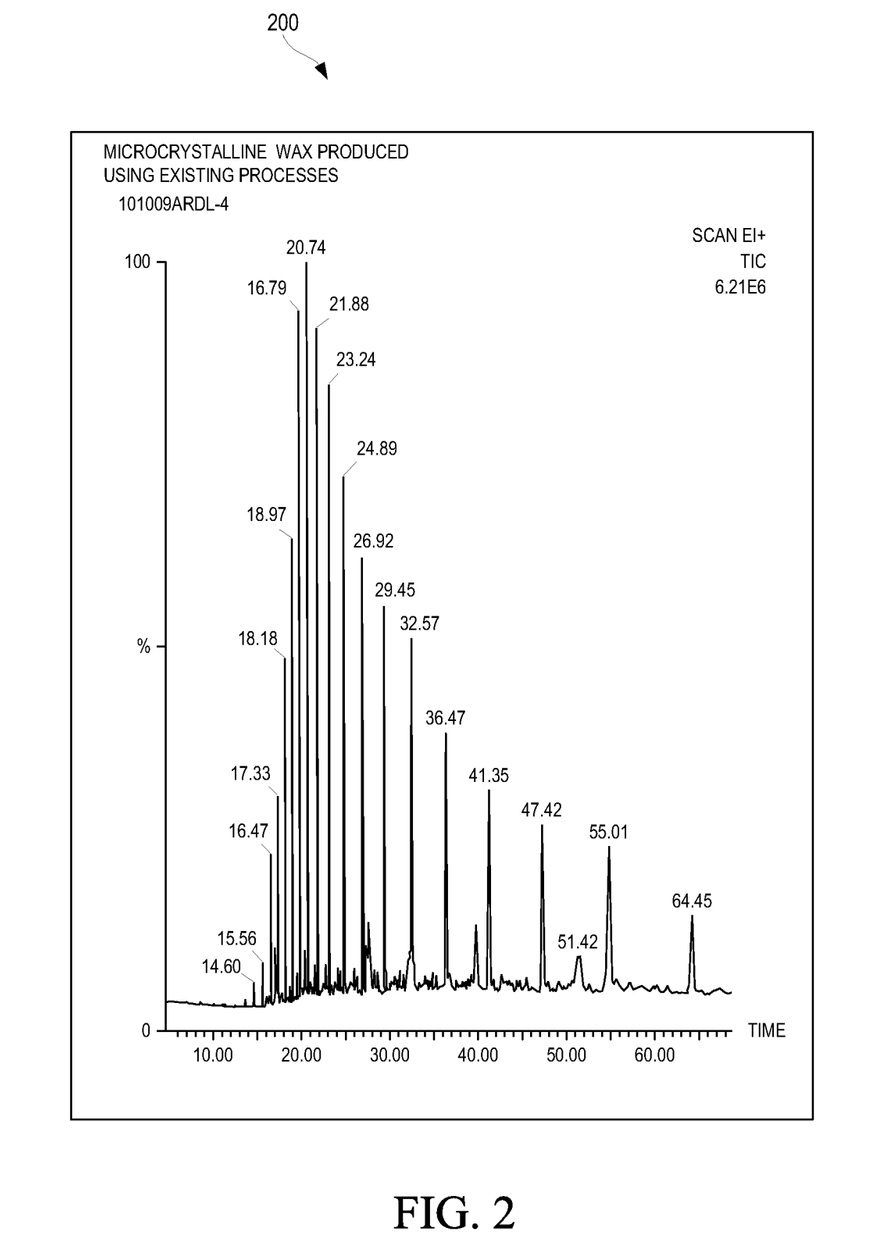
FIG. 2 shows, in the context of the invention, an exemplary graph of gas chromatography-mass spectrometry (GC-MS) results of microcrystalline wax produced using existing processes.

FIG. 2 shows, in the context of the invention, an exemplary graph 200 of gas chromatography-mass spectrometry (GC-MS) results of microcrystalline wax produced using existing processes. For example, GC-MS is a method that combines features of gas-liquid chromatography and mass spectrometry to identify different components in the microcrystalline wax produced using existing processes. (The microcrystalline waxes are type of waxes that have melting points ranging from 60° C. to 100° C. and are generally harder than paraffin waxes). The x-axis of the graph 200 represents retention time and y-axis represents intensity.

Figure 3:
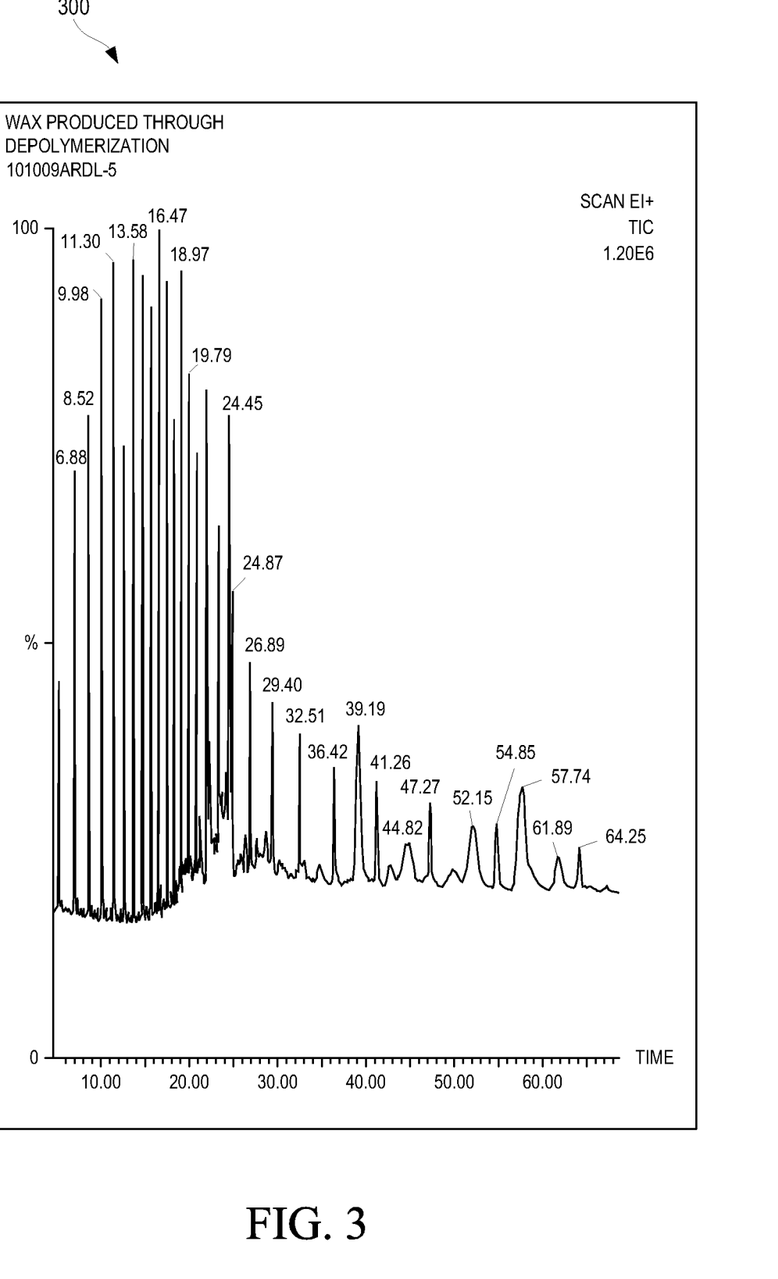
FIG. 3 shows an exemplary graph of GC-MS results of wax obtained from depolymerization of high density polyethylene (HDPE) waste, according to one embodiment.

FIG. 3 shows an exemplary graph 300 of GC-MS results of wax obtained from depolymerization of high density polyethylene (HDPE) waste, according to one embodiment. The depolymerization reaction of the HDPE waste is performed according to the process explained in FIG. 1. About 3.5 kg of the HDPE waste purchased from local market is taken for the depolymerization reaction in the high pressure reactor (which has a capacity of 6.5 liters). Different experiments are carried out to compare properties of the wax obtained from the depolymerization reaction with that of the microcrystalline wax produced using the existing processes.

In Experiment 1, a desired pressure of 140 pound-force per square inch gauge (psig) is chosen. When the pressure inside the high pressure reactor reaches 140 psig, the depolymerization reaction is stopped. The wax obtained is drained, cooled, and tested for GC-MS. TABLE 1 shows properties of the wax obtained through the depolymerization reaction compared against commercially available ARGE wax (a type of Fischer-Tropsch wax).

TABLE 1

| Sl. No. | Properties | Commercial ARGE wax | Wax obtained by catalytic depolymerization of HDPE waste |
|---|---|---|---|
| 1 | Melting Point (° C.) | 105 | 97 |
| 2 | Average Carbons | 47 | 48 |
| 3 | Nuclear magnetic resonance (NMR) | Identical | Identical |
| 4 | Solubility in Acetone (weight %) | 28 | 17.5 |
| 5 | Solubility in Cyclohexane (wt %) | 69 | 75 |
| 6 | IR | Identical | Identical |
| 7 | Acid value | 0 | 0 |
| 8 | Saponification No. | 0 | 0 |

The graph 200 and the graph 300 are compared. The comparison of molecular weight distribution (MWD) is shown in TABLE 2.

TABLE 2

| Sl. No. | Properties | Test method | Microcrystalline wax produced using existing processes | Wax obtained by catalytic depolymerization of HDPE waste |
|---|---|---|---|---|
| 1 | Melting point (° C.) | Differential scanning calorimetry (DSC) | 67.84 | 72.42 |
| 2 | Structural information | GC-MS | $C_{20}$-$C_{39}$ | $C_{14}$-$C_{41}$ |

It can be inferred from TABLE 2 and the graphs 200 and 300 that, the wax obtained from the depolymerization of the HDPE waste has broader MWD and slightly higher melting point but is otherwise comparable to the microcrystalline wax produced using the existing processes.

Figure 4:
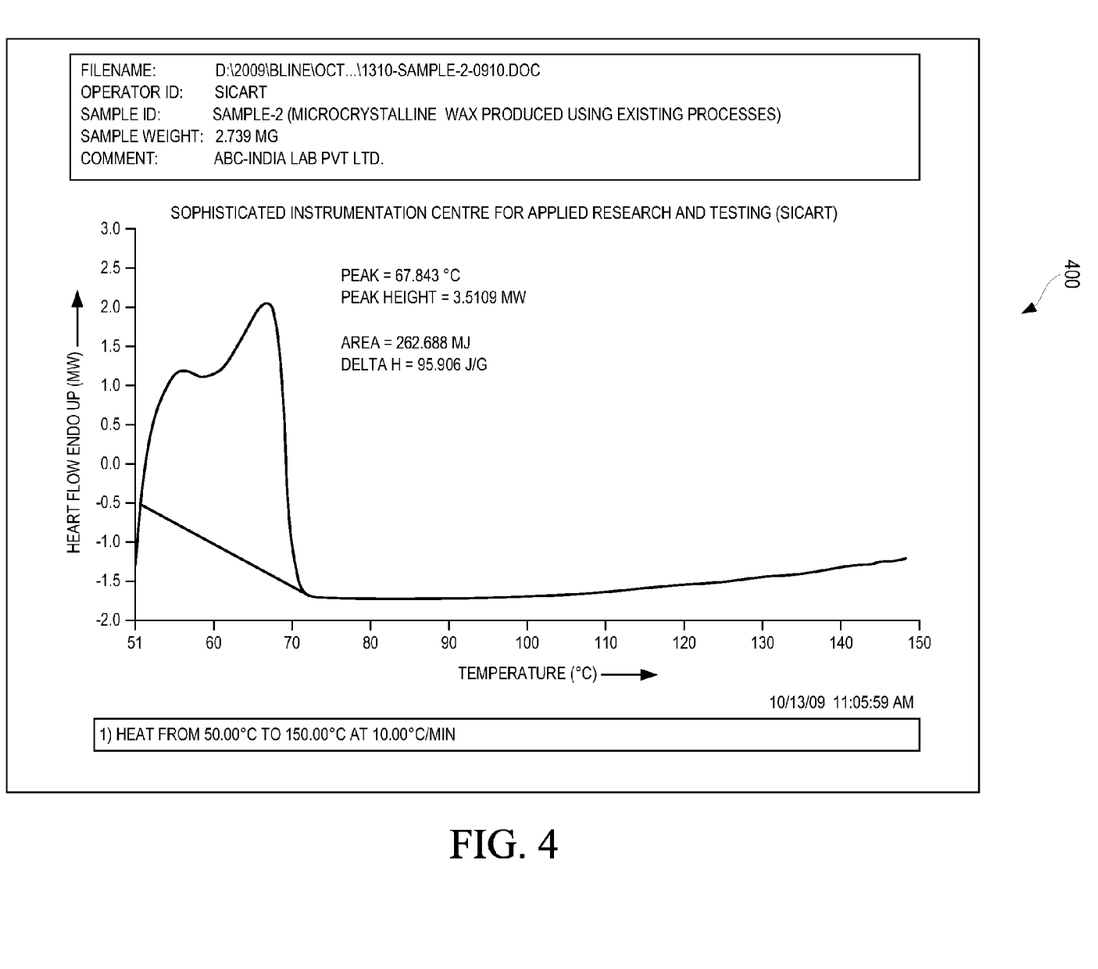
FIG. 4 shows, in the context of the invention, a graph of differential scanning calorimetric (DSC) analysis of the microcrystalline wax produced using existing processes.

FIG. 4 shows, in the context of the invention, a graph 400 of differential scanning calorimetric (DSC) analysis of the microcrystalline wax produced using existing processes. DSC is a thermoanalytical technique in which difference in amount of heat required to increase temperature of a sample and reference is measured as a function of temperature. The x-axis of the graph 400 represents temperature and the y-axis represents heat flow.

Figure 5:
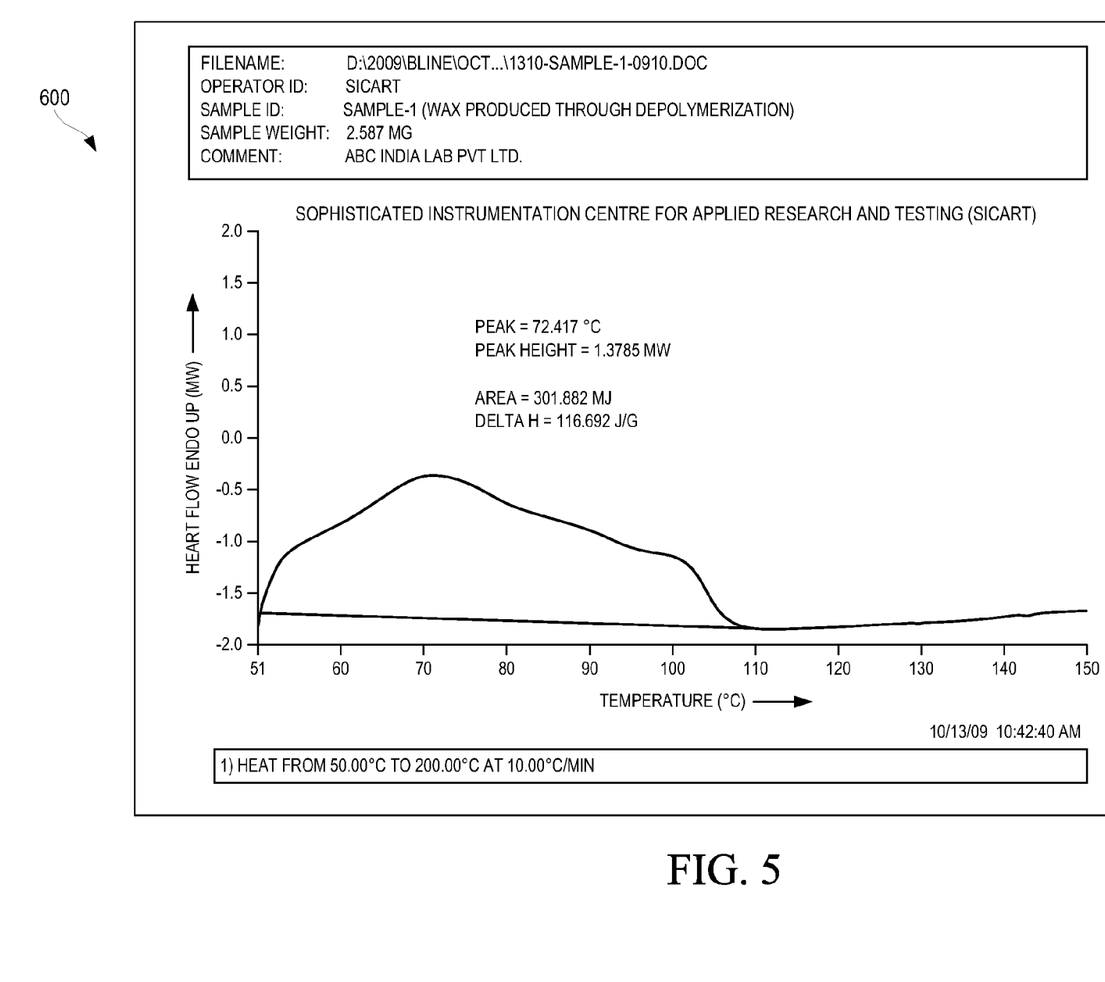
FIG. 5 shows a graph of DSC analysis of the wax obtained from the depolymerization of the HPDE waste, according to one embodiment.

FIG. 5 shows a graph 500 of DSC analysis of the wax obtained from the depolymerization of HPDE waste, according to one embodiment. The graph 400 and the graph 500 are compared. The melting point of the wax obtained from the depolymerization of the HDPE is about 10% higher than that of the microcrystalline wax produced using the existing processes. Further, the wax produced from the HDPE is found to have a natural tack which makes it highly suitable for wax polishes and shoe polishes.

Experiment 2 considers the melting point of wax which is an important property. The melting point of wax is determined by the desired value of pressure inside the high pressure reactor. TABLE 3 below shows different values of pressure which yields waxes of different melting points.

TABLE 3

| Sl. No. | Pressure (psig) | Melting point of product wax (° C.) |
|---|---|---|
| 1 | 50 | 100 |
| 2 | 80 | 90 |
| 3 | 110 | 80 |
| 4 | 140 | 75 |
| 5 | 200 | 60 |

In Experiment 3, the following composition of feed is considered in the high pressure reactor. It should be noted that the HDPE, LDPE, and LLDPE are available as primary granules.

1. Primary granules of HDPE, LDPE and LLDPE as pure feed
2. Waste materials of HDPE, LDPE and LLDPE as pure feed
3. Various mixtures of primary granules of HDPE, LDPE and LLDPE
4. Various mixtures of waste materials of HDPE, LDPE and LLDPE
5. Mixture of (1) and (2)
6. Waste materials of HDPE, LDPE and LLDPE as pure feeds with 10% of impurities of polystyrene and polypropylene.

In each of the cases, the desired value of pressure inside the high pressure reactor remained unchanged indicating that the catalyst is specific to breaking of $CH_2$—$CH_2$ bonds and is relatively insensitive to the nature of feed.

In Experiment 4, water emulsion of various waxes produced in Experiment 2 is prepared and below composition is followed:

Composition A—Wax 5 g and Stearic acid 2.5 g

Composition B—Water 300 g, Morpholine 3 g and Stearic acid 2.5 g

Solids in composition A are mixed and melted. This is mixed with already heated composition B. The emulsion is obtained on stirring. It can be seen that, the emulsion is stable and the wax does not separate from the water layer. The emulsion thus formed forms a very thin layer of wax on coating having strength depending upon the melting point of the wax used.

In Experiment 5, grease base stock is produced for cut-off pressure of 250-300 psig (which is Sample 1) and cut-off pressure of 300-350 psig (Sample 2). In one embodiment, viscosities of the sample 1 and the sample 2 are determined as a function of temperature and shear rate.

Figure 6:
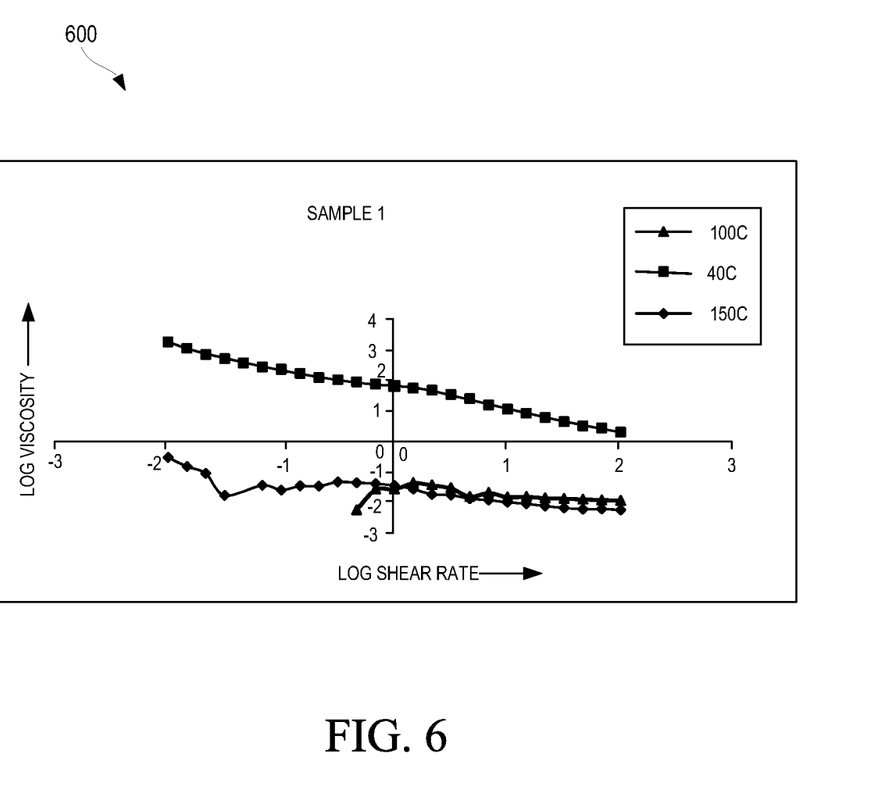
FIG. 6 shows a graph of log shear versus log viscosity of sample 1 of the grease base stock, according to one embodiment.

FIG. 6 shows a graph 600 of log shear versus log viscosity of sample 1 of the grease base stock, according to one embodiment. The log shear is represented on x-axis and log viscosity is represented on y-axis of the graph 600. The shear rate, shear stress and viscosity of sample 1 at 40° C., 100° C. and 150° C. are given in TABLES 4, 5 and 6.

TABLE 4

(at 40° C.)

| Shear Rate[1/s] | Shear Stress[Pa] | Viscosity [Pa · s] |
|---|---|---|
| 0.01 | 18.9 | 1,890 |
| 0.0147 | 16.8 | 1,150 |
| 0.0215 | 16.9 | 786 |
| 0.0316 | 17.9 | 566 |
| 0.0464 | 19 | 410 |
| 0.0681 | 20.5 | 301 |
| 0.1 | 22.7 | 227 |
| 0.147 | 25.7 | 175 |
| 0.215 | 29.6 | 137 |
| 0.316 | 34.6 | 110 |
| 0.464 | 41.8 | 90 |
| 0.681 | 52.9 | 77.7 |
| 1 | 70.8 | 70.8 |
| 1.47 | 92.3 | 62.9 |
| 2.15 | 106 | 49.2 |
| 3.16 | 112 | 35.5 |
| 4.64 | 117 | 25.2 |
| 6.81 | 122 | 17.9 |
| 10 | 128 | 12.8 |
| 14.7 | 135 | 9.22 |
| 21.5 | 145 | 6.72 |
| 31.6 | 156 | 4.94 |
| 46.4 | 172 | 3.71 |
| 68.1 | 193 | 2.83 |
| 100 | 219 | 2.19 |

TABLE 5

(100° C.)

| Shear Rate[1/s] | Shear Stress[Pa] | Viscosity [Pa · s] |
|---|---|---|
| 0.464 | 0.00276 | 0.00594 |
| 0.681 | 0.019 | 0.0278 |
| 1 | 0.0285 | 0.0285 |
| 1.47 | 0.0669 | 0.0456 |
| 2.15 | 0.0835 | 0.0388 |
| 3.16 | 0.0983 | 0.0311 |
| 4.64 | 0.0751 | 0.0162 |
| 6.81 | 0.148 | 0.0217 |
| 10 | 0.157 | 0.0157 |
| 14.7 | 0.238 | 0.0162 |
| 21.5 | 0.312 | 0.0145 |
| 31.6 | 0.441 | 0.0139 |
| 46.4 | 0.613 | 0.0132 |
| 68.1 | 0.85 | 0.0125 |
| 100 | 1.2 | 0.012 |

TABLE 6

(150° C.)

| Shear Rate[1/s] | Shear Stress[Pa] | Viscosity [Pa · s] |
|---|---|---|
| 0.01 | 0.00319 | 0.319 |
| 0.0147 | 0.00233 | 0.159 |
| 0.0215 | 0.00202 | 0.0939 |
| 0.0316 | 0.00055 | 0.0175 |
| 0.0464 | 0.000423 | 0.00912 |
| 0.0681 | 0.00258 | 0.0379 |
| 0.1 | 0.00265 | 0.0265 |
| 0.147 | 0.00532 | 0.0363 |
| 0.215 | 0.00772 | 0.0358 |
| 0.316 | 0.0155 | 0.0491 |
| 0.464 | 0.0215 | 0.0464 |
| 0.681 | 0.0295 | 0.0432 |
| 1 | 0.0374 | 0.0374 |
| 1.47 | 0.0418 | 0.0285 |
| 2.15 | 0.0407 | 0.0189 |
| 3.16 | 0.0574 | 0.0181 |
| 4.64 | 0.0637 | 0.0137 |

TABLE 6-continued (150° C.)

| Shear Rate[1/s] | Shear Stress[Pa] | Viscosity [Pa · s] |
|---|---|---|
| 6.81 | 0.0835 | 0.0123 |
| 10 | 0.104 | 0.0104 |
| 14.7 | 0.136 | 0.00924 |
| 21.5 | 0.167 | 0.00777 |
| 31.6 | 0.214 | 0.00677 |
| 46.4 | 0.285 | 0.00614 |
| 68.1 | 0.426 | 0.00625 |
| 100 | 0.583 | 0.00583 |

Figure 7:
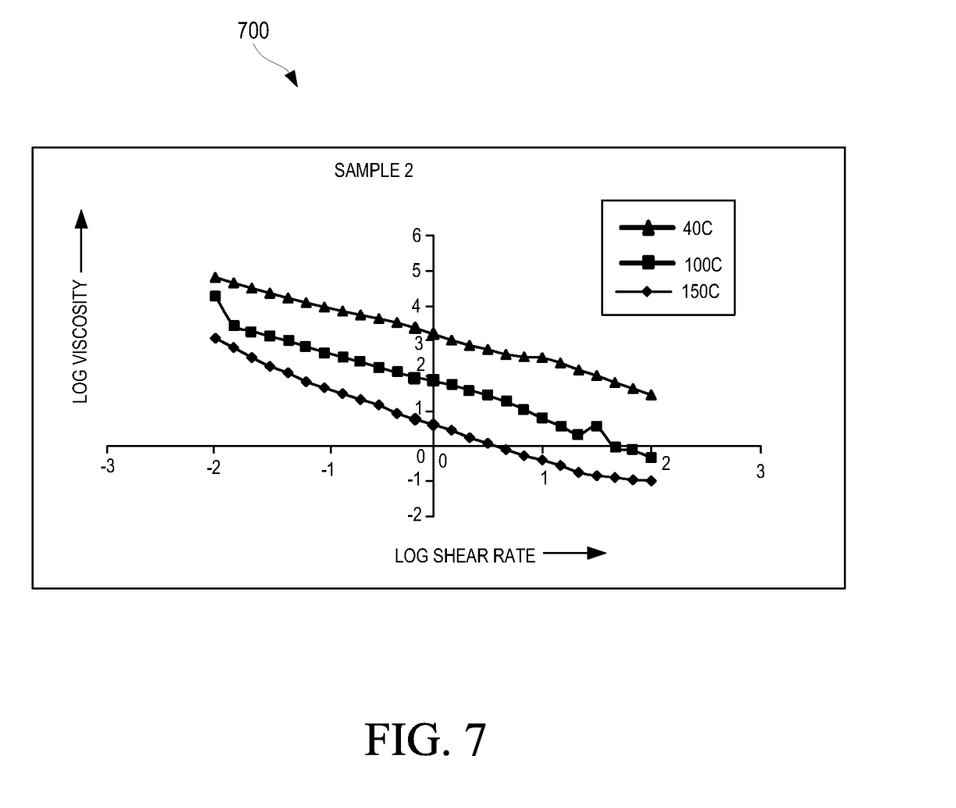
FIG. 7 shows a graph of log shear versus log viscosity of sample 2 of the grease base stock, according to one embodiment.

FIG. 7 shows a graph 700 of log shear versus log viscosity of sample 2 of the grease base stock, according to one embodiment. The log shear is represented on x-axis and log viscosity is represented on y-axis of the graph 700. The shear rate, shear stress and viscosity of sample 1 at 40° C., 100° C. and 150° C. are given in TABLES 6, 7 and 8.

TABLE 6

(at 40° C.)

| Shear Rate[1/s] | Shear Stress[Pa] | Viscosity [Pa · s] |
|---|---|---|
| 0.00998 | 617 | 61,800 |
| 0.0147 | 632 | 43,000 |
| 0.0215 | 657 | 30,500 |
| 0.0316 | 693 | 21,900 |
| 0.0464 | 736 | 15,900 |
| 0.0681 | 798 | 11,700 |
| 0.1 | 879 | 8,790 |
| 0.147 | 987 | 6,720 |
| 0.215 | 1,130 | 5,240 |
| 0.316 | 1,300 | 4,120 |
| 0.464 | 1,470 | 3,170 |
| 0.681 | 1,520 | 2,230 |
| 1 | 1,520 | 1,510 |
| 1.47 | 1,470 | 1,000 |
| 2.15 | 1,530 | 709 |
| 3.16 | 1,720 | 544 |
| 4.64 | 1,820 | 393 |
| 6.81 | 2,280 | 335 |
| 10 | 3,170 | 316 |
| 14.7 | 3,290 | 224 |
| 21.6 | 3,070 | 142 |
| 31.6 | 3,100 | 97.9 |
| 46.4 | 2,880 | 62.1 |
| 68.1 | 2,840 | 41.7 |
| 100 | 2,760 | 27.6 |

TABLE 7

(at 100° C.)

| Shear Rate[1/s] | Shear Stress[Pa] | Viscosity [Pa · s] |
|---|---|---|
| 0.00999 | 175 | 17,500 |
| 0.0147 | 38.5 | 2,630 |
| 0.0215 | 39 | 1,810 |
| 0.0316 | 40.1 | 1,270 |
| 0.0464 | 44.1 | 950 |
| 0.0681 | 43.9 | 644 |
| 0.1 | 45.8 | 458 |
| 0.147 | 48.1 | 328 |
| 0.215 | 51.3 | 238 |
| 0.316 | 53.8 | 170 |
| 0.464 | 55.4 | 119 |
| 0.681 | 60.9 | 89.4 |
| 1 | 69.5 | 69.5 |
| 1.47 | 76.8 | 52.3 |
| 2.15 | 83.5 | 38.8 |
| 3.16 | 84.6 | 26.8 |
| 4.64 | 82.8 | 17.8 |

TABLE 7-continued (at 100° C.)

| Shear Rate[1/s] | Shear Stress[Pa] | Viscosity [Pa · s] |
|---|---|---|
| 6.81 | 74.8 | 11 |
| 10 | 59.2 | 5.92 |
| 14.7 | 53.9 | 3.67 |
| 21.5 | 45.7 | 2.12 |
| 31.5 | 110 | 3.49 |
| 46.4 | 40.2 | 0.867 |
| 68.1 | 50.7 | 0.744 |
| 100 | 45.8 | 0.458 |

TABLE 8

(at 150° C.)

| Shear Rate[1/s] | Shear Stress[Pa] | Viscosity [Pa · s] |
|---|---|---|
| 0.01 | 11.6 | 1,160 |
| 0.0147 | 9.23 | 628 |
| 0.0316 | 5.77 | 183 |
| 0.0464 | 5.59 | 120 |
| 0.0681 | 4.54 | 66.7 |
| 0.1 | 4.48 | 44.8 |
| 0.147 | 4.46 | 30.4 |
| 0.215 | 4.46 | 20.7 |
| 0.316 | 4.61 | 14.6 |
| 0.464 | 3.86 | 8.32 |
| 0.681 | 3.9 | 5.72 |
| 1 | 3.97 | 3.97 |
| 1.47 | 4.08 | 2.78 |
| 2.15 | 3.63 | 1.69 |
| 3.16 | 3.72 | 1.18 |
| 4.64 | 3.6 | 0.776 |
| 6.81 | 3.55 | 0.521 |
| 10 | 3.92 | 0.392 |
| 14.7 | 4.04 | 0.275 |
| 21.5 | 3.72 | 0.173 |
| 31.6 | 4.41 | 0.14 |
| 46.4 | 5.82 | 0.125 |
| 68.1 | 7.26 | 0.107 |
| 100 | 10 | 0.1 |

The above-mentioned experiments suggest that smaller cut-off pressure yields grease base stocks with higher viscosity. As the temperature of the grease base stock is increased, value of the viscosity is decreased as expected. For a given temperature and cut-off pressure, the viscosity is dependent upon the shear rate and falls drastically. Up to 100 per second shear rate, the viscosity falls by a factor of 1000, leading to an increase in lubrication by the same factor. This indicates that the grease base stock has a natural ability to give a high degree of lubrication.

Figure 8:
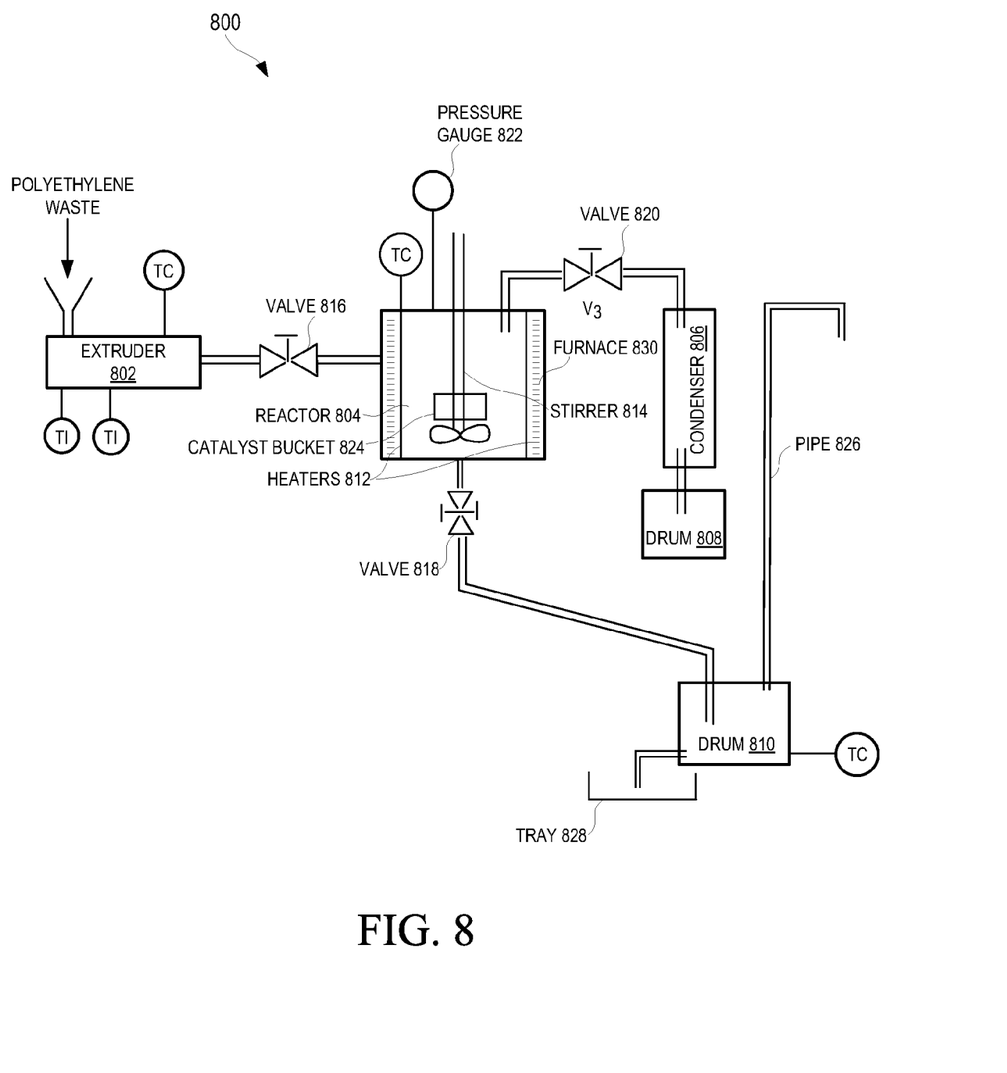
FIG. 8 shows a block diagram of a device for converting the mixed polyethylene waste to make waxes and grease base stocks, according to one embodiment.

FIG. 8 shows a block diagram 800 of a device for producing waxes and grease base stocks through catalytic depolymerization of waste plastics, according to one embodiment. Particularly, the device includes an extruder 802, a furnace 830, a reactor 804, a condenser 806, a drum 808, a drum 810, and a tray 828.

The extruder 802 is a four inch barrel which is twenty four inches long. The extruder 802 preheats the polyethylene waste and pushes molten polyethylene waste to the reactor 804. The extruder 802 operates at 300° C. and pushes the molten polyethylene waste through a valve 816. In one embodiment, preheating the polyethylene waste may make possible lower processing time of the polyethylene waste in the reactor 804 since the preheating takes place outside the reactor 804 (in the extruder 802). Further, a semi-continuous process is ensured in the reactor 804.

The reactor 804 is 2 cm thick, 15 cm in diameter and 30 cm in length and has a working capacity of 6.5 liters. As shown, the furnace 830 includes heaters 812 to heat the reactor 804. The temperature in the reactor 804 is maintained at 450° C. The reactor 804 includes a stirrer 814, a pressure gauge 822, and a catalyst bucket 824. The reactor 804 is designed in such a way that walls of the reactor 804 withstands high temperature and pressures during the depolymerization process. The catalytic bucket 824 carries a catalyst which accelerates the depolymerization reaction of the molten polyethylene waste in the reactor 804. In one example embodiment, the catalyst used is [Fe—Cu—Mo—P]/$Al_2O_3$.

In operation, when the reactor 804 receives the molten polyethylene waste, the temperature falls from 450° C. When the temperature falls, temperature of the heaters 812 is increased to ensure that pressure inside the reactor 804 is maintained at one atmospheric pressure by closing a valve 818 and opening a valve 820. The pressure inside the reactor 804 is measured using the pressure gauge 822. In one embodiment, the pressure inside the reactor 804 affects quality of wax formed. It can be noted that, volume of the molten polyethylene waste which is fed into the reactor 804 is doubled at the temperature inside the reactor 804.

The valve 816 and the valve 820 are closed to increase the pressure in the reactor 804. When a desired pressure (in the range of 50 psig-350 psig) is reached inside the reactor 804, the heaters 812 are turned off and the depolymerization reaction is stopped. The depolymerization reaction takes about one hour in the reactor 804. The valve 820 is gradually opened and the pressure inside the reactor 804 is allowed to fall to one atmospheric pressure. Vapor from the reactor 804 escapes through the valve 820 to the condenser 806 and is finally collected in the drum 808. The temperature inside the reactor 804 remains unchanged.

As the pressure in the reactor 804 falls to one atmospheric pressure, the valve 820 is closed and the valve 818 is opened to drain produced material. The pressure reduction to one atmosphere inside the reactor 804 initiates coalescence process of organic and inorganic pigment impurities (such as carbon, calcium carbonate, etc.) present along with the polyethylene waste. The pigment impurities coalesce and settle as separate layers through manipulation of the valves 816, 818 and 820. There is no requirement of an additional process to separate the pigment impurities from the produced waxes and grease base stocks. Thus, high to low pressure cycles inside the reactor 804 separates the pigment impurities leaving behind pure waxes and grease base stocks. The slight amount of pressure that is developed inside the reactor 804 pushes the produced products from the reactor 804 into the drum 810.

When the products are poured into the drum 810 at over 400° C., small amounts of hydrocarbon vapors may be produced. A pipe 826 over the drum 810 ensures that the hydrocarbon vapors so formed do not escape into atmosphere and is completely condensed within the drum 810. This hydrocarbon vapors form a protective covering on top of the wax or the grease base stock preventing the wax and the grease base stocks coming in direct contact with the atmosphere and its burning. The products collected in the drum 810 are condensed at 200° C. and is then drained into the tray 828. This process ensures that the liquid products may be drained out at over 400° C., even though such a temperature is significantly above flash point of the waxes or grease base stocks.

The reduction of pressure and removal of the produced material from the reactor 804 may take about 30 minutes. Thus, one cycle of the catalytic depolymerization may take about two and a half hours. It can be seen that, the depolymerization reaction is not sensitive to impurities such as polypropylene and polystyrene up to about 10% present along the polyethylene waste. Waxes and grease base stocks of specified quality may be obtained by manipulating process conditions and valves 818 and 820. For example, by manipulating the desired pressure inside the reactor 804, waxes of different grades (e.g., having different melting points) are obtained.

In various embodiments, the processes described in FIGS. 1 through 8 uses a new catalyst which is not deactivated and lasts for over one year of use in the process, thereby making the process economical. The catalyst is stable throughout the reaction temperatures of 300° C.-600° C. and depolymerizes HDPE, LDPE, and LLDPE equally. The catalyst is also unaffected by any pigment impurities. Further, the use of extruder for preheating the polyethylene waste ensures that molten polyethylene waste at high temperatures is fed into the reactor. This may also enable a semi-continuous process in the reactor. During the above-described process, there is a total carbon recovery of the polyethylene waste into desired products, which makes the process eco-friendly.

Although the present embodiments have been described with reference to specific example embodiments, it will be evident that various modifications and changes may be made to these embodiments without departing from the broader spirit and scope of the various embodiments.

What is claimed is:

1. A process for converting mixed polyethylene waste to make waxes and grease base stock through catalytic depolymerization, comprising:
    preheating the mixed polyethylene waste to form a molten mixed polyethylene waste;
    starting depolymerization reaction of the molten mixed polyethylene waste using a catalyst in a pressurized reactor at a desired temperature using heaters in the pressurized reactor and wherein the catalyst is disposed inside the pressurized reactor;
    allowing progression of the depolymerization reaction of the molten mixed polyethylene waste to continue until a pressure in the pressurized reactor reaches a desired value; and
    turning off the heaters and stopping the depolymerization reaction of the molten mixed polyethylene waste upon the pressure in the reactor reaching the desired value, wherein the mixed polyethylene waste is converted to wax or a grease base stock, and wherein the catalyst is [Fe—Cu—Mo—P]/$Al_2O_3$, prepared by binding a ferrous-copper complex to an alumina support and reacting it with heteropolyacid.

2. The process of claim 1, further comprising: draining the converted wax or grease base stock into a container when the converted wax or grease base stock is liquid and is substantially above the flash point.

3. The process of claim 1, wherein the temperature is in the range of about 300° C. to 600° C.

4. The process of claim 1, wherein preheating the mixed polyethylene waste to form the molten mixed polyethylene waste comprises: preheating the mixed polyethylene waste using an extruder to form the molten mixed polyethylene waste and wherein the extruder is attached to the reactor.

5. The process of claim 4, further comprising: substantially continuously pushing the mixed polyethylene waste into the reactor upon the mixed polyethylene reaching the molten state in the extruder.

6. The process of claim 1, wherein the pressure is in the range of about 50 psig-350 psig.

7. The process of claim 1, wherein the mixed polyethylene waste comprises polyethylene selected from the group consisting of low density polyethylene (LPDE), linear low density polyethylene (LLPDE) and high density polyethylene (HPDE).

8. The process of claim 1, wherein the mixed polyethylene waste comprises impurities up to about 10%, and wherein the impurities comprises materials selected from the group consisting of polypropylene and polystyrene.

9. The process of claim 1, further comprising: varying the desired value of the pressure in the pressurized reactor to produce different grades of waxes and grease base stocks.

10. The process of claim 2, further comprising:
inducing coalescence of pigment particles/impurities in the drained converted wax or grease base stock using a high to low pressure cycle; and
allowing the pigment particles/impurities and the converted wax or grease base stock to settle in the container as separate layers.

11. A process for converting primary granules of polyethylene to make waxes and grease base stock through catalytic depolymerization, comprising:
preheating the primary granules of polyethylene to form a molten primary granules of polyethylene;
starting depolymerization reaction of the molten primary granules of polyethylene using a catalyst in a pressurized reactor at a desired temperature using heaters in the pressurized reactor and wherein the catalyst is disposed inside the pressurized reactor;
allowing progression of the depolymerization reaction of the molten primary granules of polyethylene to continue until a pressure in the pressurized reactor reaches a desired value; and
turning off the heaters and stopping the depolymerization reaction of the molten primary granules of polyethylene upon the pressure in the reactor reaching the desired value, wherein the primary granules of polyethylene is converted to wax or grease base stock, and wherein the catalyst is [Fe—Cu—Mo—P]/$Al_2O_3$ prepared by binding a ferrous-copper complex to an alumina support and reacting it with heteropolyacid.

12. The process of claim 11, further comprising: draining the converted wax or the grease base stock into a container when the converted wax or grease base stock is liquid and is substantially above the flash point.

13. The process of claim 11, wherein the temperature is in the range of about 300° C. to 600° C.

14. The process of claim 11, wherein the pressure is in the range of about 50 psig-350 psig.

15. The process of claim 11, wherein preheating the primary granules of polyethylene to form the molten primary granules of polyethylene comprises: preheating the primary granules of polyethylene using an extruder to form the molten primary granules of polyethylene and wherein the extruder is attached to the reactor.

16. The process of claim 15, further comprising: substantially continuously pushing the primary granules of polyethylene into the reactor upon the primary granules of polyethylene reaching the molten state in the extruder.

17. The process of claim 11, wherein the primary granules of polyethylene comprises polyethylene selected from the group consisting of LPDE, LLPDE and HPDE.

18. The process of claim 11, further comprising: varying the desired value of the pressure in the pressurized reactor to produce different grades of waxes and grease base stocks.

19. The process of claim 12, further comprising:
inducing coalescence of pigment particles/impurities in the drained converted wax or grease base stock using a high to low pressure cycle; and
allowing the pigment particles/impurities and the converted wax or grease base stock to settle in the container as separate layers.

20. A process for converting mixed polyethylene waste to make grease base stock through catalytic depolymerization, comprising:
preheating the mixed polyethylene waste to form a molten mixed polyethylene waste;
starting depolymerization reaction of the molten mixed polyethylene waste using a catalyst in a pressurized reactor at a desired temperature using heaters in the pressurized reactor and wherein the catalyst is disposed inside the high pressurized reactor;
allowing progression of the depolymerization reaction of the molten mixed polyethylene waste to continue until a pressure in the pressurized reactor reaches a desired value; and
turning off the heaters and stopping the depolymerization reaction of the molten mixed polyethylene waste upon the pressure in the reactor reaching the desired value, wherein the mixed polyethylene waste is converted to the grease base stock, and wherein the catalyst is [Fe—Cu—Mo—P]/$Al_2O_3$ prepared by binding a ferrous-copper complex to an alumina support and reacting it with heteropolyacid.

21. The process of claim 20, further comprising: draining the converted grease base stock into a container when the converted grease base stock is liquid and is substantially above the flash point.

22. A process for converting mixed polyethylene waste to make waxes through catalytic depolymerization, comprising:
preheating the mixed polyethylene waste to form a molten mixed polyethylene waste;
starting depolymerization reaction of the molten mixed polyethylene waste using a catalyst in a pressurized reactor at a desired temperature using heaters in the pressurized reactor and wherein the catalyst is disposed inside the pressurized reactor;
allowing progression of the depolymerization reaction of the molten mixed polyethylene waste to continue until a pressure in the pressurized reactor reaches a desired value; and
turning off the heaters and stopping the depolymerization reaction of the molten mixed polyethylene waste upon the pressure in the reactor reaching the desired value, wherein the mixed polyethylene waste is converted to wax, and wherein the catalyst is [Fe—Cu—Mo—P]/$Al_2O_3$, prepared by binding a ferrous-copper complex to an alumina support and reacting it with heteropolyacid.

23. The process of claim 22, further comprising: draining the converted wax into a container when the converted wax is liquid and is substantially above the flash point.

* * * * *